Jan. 21, 1969  E. G. LILL ET AL  3,422,531
HEDGE TRIMMER
Filed Jan. 10, 1967  Sheet 1 of 2
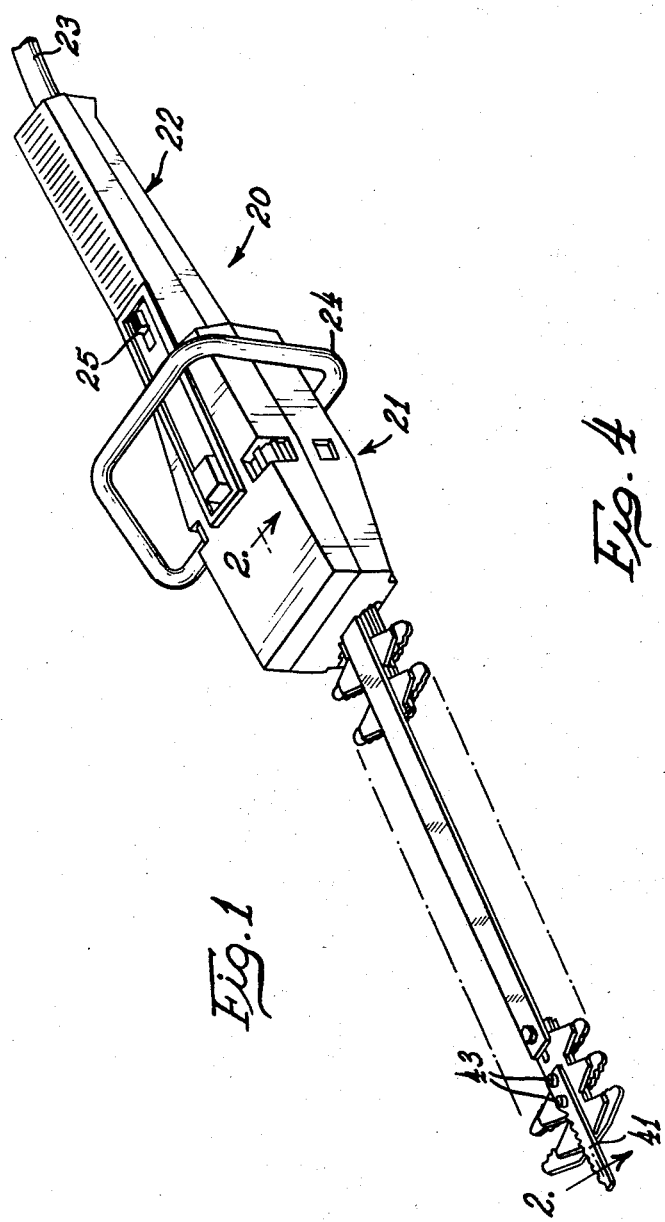
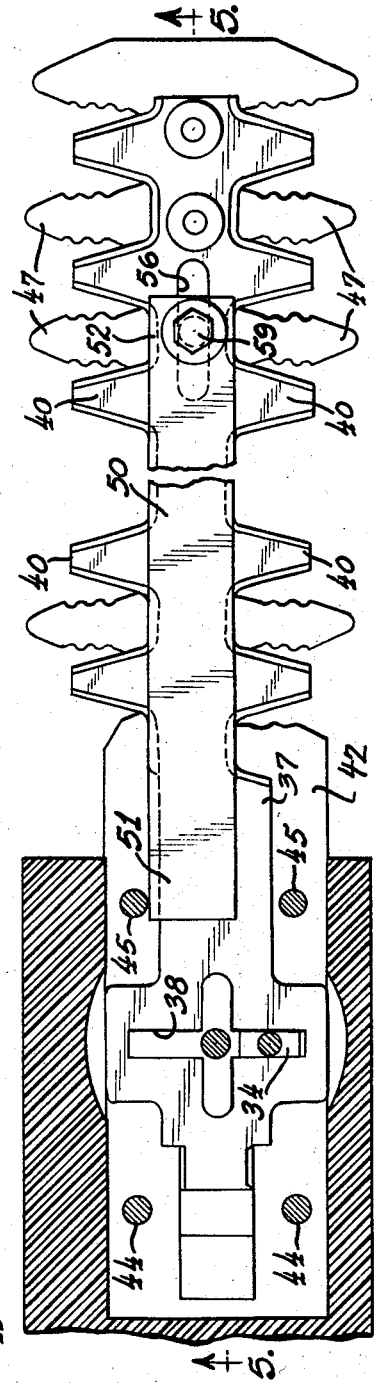
Inventors
WILLIAM J. BANDY JR.
ETCHISON G. LILL
By Robert W. Dudley
Att'y

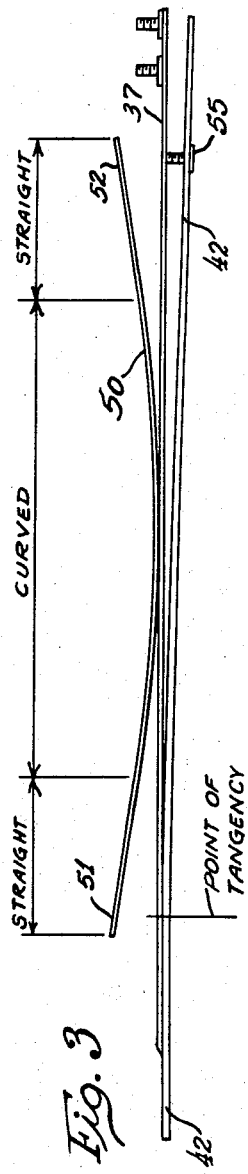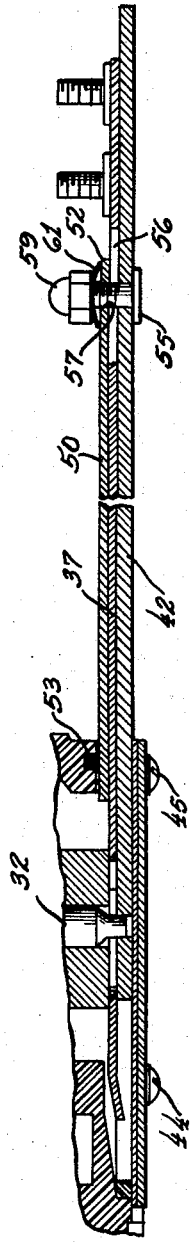

United States Patent Office 3,422,531
Patented Jan. 21, 1969

3,422,531
HEDGE TRIMMER
Etchison G. Lill, Wheaton, Ill., and William J. Bandy, Jr., Akron, Ohio, assignors to Sunbeam Corporation, Chicago, Ill., a corporation of Illinois
Filed Jan. 10, 1967, Ser. No. 608,373
U.S. Cl. 30—210                11 Claims
Int. Cl. B26b 19/02

ABSTRACT OF THE DISCLOSURE

An electrically operated hedge trimmer having an elongated stationary comb and a reciprocable cutter with a tension plate which is curved prior to assembly so that when assembled to the comb at points only near each end, the tension plate establishes a uniform shearing force between the comb and cutter.

Background of the invention

Power operated hedge trimmers normally have a power means in a housing from which an elongated stationary comb extends. Overlying the comb is an elongated cutter which is in sliding engagement therewith, and the cutter is connected to the power means for reciprocation in a lengthwise direction. Both the comb and cutter are formed with teeth along at least one lengthwise edge for shearing a hedge or the like. In order to maintain a proper shearing force or pressure between the comb and cutter, a long, narrow plate is positioned on top of the cutter, and a plurality of fasteners, normally nuts and bolts, are spaced along the length of the plate to draw the cutter against the comb. An example of this construction is illustrated and described in Patent No. 3,083,457.

While the aforementioned comb and cutter arrangement performs satisfactorily, it has a number of shortcomings. When many nuts and bolts are used along the length of the comb and cutter, they constitute projections against which shrubbery can strike or catch, causing an uneven cutting movement. Naturally, the fewer nuts and bolts used, the less of a problem is presented. However, in order for the comb and cutter to shear properly, the correct cutting pressure must be maintained therebetween along substantially their entire length. Consequently, since the cutting action is the paramount consideration, the nuts and bolts are rather closely spaced along the comb and cutter. It should be appreciated that the force at each bolt is at a maximum value and decreases between adjacent bolts.

Another problem with using the many nuts and bolts along the cutter assembly is that the comb and cutter are rather rigidly held together so that if a branch were jammed between them, a severe load would be imposed upon the mechanism within the hedge trimmer housing. This being the case, it is normal practice to include some sort of overload clutch system to lessen the likelihood of damage. Therefore, it would be a considerable advance in the hedge trimmer art if the comb and cutter were under the proper pressure for normal shearing load but would separate when an object became jammed between the comb and cutter so that the unit is not brought to a sudden stop. Moreover, if the number of nuts and bolts could be reduced, an obvious cost savings would be realized.

Accordingly, it is an object of the present invention to provide a hedge trimmer having an improved means for establishing a proper shearing pressure between the comb and cutter.

Another object of the present invention is to provide a hedge trimmer having an elongated cutter assembly provided with a minimum number of transversely extending members which can interfere with the cutting movement thereof.

Still another object of the present invention is to provide a hedge trimmer elongated cutter assembly having a tension plate for applying uniform pressure between the comb and cutter along their length which plate is held to the comb only near the ends thereof.

A further object of the present invention is to provide an elongated hedge trimmer cutter assembly having a comb and cutter which are biased together with a proper shearing pressure which assembly is so constructed so that the comb and cutter can separate when an object becomes jammed therebetween.

Still a further object of the present invention is to provide a hedge trimmer cutter assembly including a comb and a tension plate which is formed prior to assembly so that a uniform pressure is established along the assembly after the plate is secured to the comb near only the ends of the plate.

Further objects and advantages of the present invention will become apparent as the following description proceeds and the features of novelty which characterize the invention will be pointed out with particularity in the claims annexed to and forming a part of this specification.

Summary of the invention

Briefly, the present invention relates to a motor operated hedge trimmer being provided with an elongated cutter assembly comprising a stationary comb which is attached to the hedge trimmer housing and a cutter which is reciprocated by motor means within the housing. An elongated tension plate overlies the cutter and is secured to the comb only near each end thereof. Prior to assembly, the tension plate has a form which after assembly establishes a uniform pressure between the comb and cutter along their length. Preferably, one end of the plate is held to the comb by the hedge trimmer housing and the other by fastener means.

Brief description of the drawing

For a better understanding of the present invention, reference may be had to the accompanying drawings in which:

FIG. 1 is a perspective view of a hedge trimmer embodying the present invention shown with a portion of the electric power cord removed;

FIG. 2 is a fragmentary, partially sectioned view taken substantially along line 2—2 of FIG. 1 with the saw blade removed;

FIG. 3 is a side elevational view of the comb, cutter and tension plate prior to assembly;

FIG. 4 is an enlarged, sectional view taken substantially along line 4—4 of FIG. 2 with a portion of the cutter assembly broken away; and FIG. 5 is a fragmentary, sectional view taken substantially along line 5—5 of FIG. 4.

Description of the preferred embodiment

Referring to the drawings in which like numerals designate like parts throughout the several views, the hedge trimmer is designated generally by the reference numeral 20. As can be seen in FIG. 1, the hedge trimmer 20 includes an elongated housing 21 having a split construction and preferably molded from a suitable plastic material. The housing 21 has a hand gripping portion 22 from which an electric cord 23 emanates. In addition to the hand grip portion 22, the housing can be supported by auxiliary looped handle 24. On the upper surface of the housing 21 is an electric switch 25 which controls the operation of electric motor 27 disposed within the housing. The present invention is not directed to the detailed construction of the housing; but preferably, the housing and the mechanism therein should be made in accordance with copending hedge trimmer application Ser. No. 569,490 which is assigned to the same assignee as the present application.

For the purposes of this application, it should be appreciated that motor 27 includes an armature 28 having a worm gear 29 formed near one end thereof which is in driving engagement with gear member 31 rotatably mounted on vertical shaft 32. An eccentric 34 is rotatably secured to the gear member 31 and offset from vertical shaft 32 so that upon the rotation of member 31, eccentric 34 imparts a reciprocating motion to cutter 37. The reciprocating motion is accomplished by eccentric 34 riding in a transversely extending slot 38 formed in the end of cutter 37 disposed within the hedge trimmer housing 21. It should be understood that means are provided which limit the motion of the cutter 37 to a pure linear reciprocating movement.

In the present embodiment, the elongated cutter 37 has a row of teeth 40 disposed along both lengthwise edges thereof, and a saw attachment 41 is removably secured by fasteners 43 to the end of the cutter remote from the housing 21. Located immediately below the cutter 37 is stationary elongated comb 42 which is rigidly fastened to the housing 21 by means of screws 44 and 45. The comb 42 also includes a double row of teeth 47 which are adapted to cooperate with cutter teeth 40 in order to shear material therebetween when the cutter 37 is reciprocated. However, in order for the comb 42 and cutter 37 to effectively cooperate with each other in shearing relationship, it is necessary that a proper pressure be maintained between these two cutting elements. For this purpose, tension plate 50 is provided and is positioned overlying cutter 37.

Preferably, the pressure or tension plate 50 is fabricated from a suitable resilient steel, and the plate is relatively thin in comparison to the comb 42 which is also formed from a suitable resilient steel. As can be conveniently viewed in FIG. 3, the tension plate 50 is formed prior to assembly with a curved configuration so that ends 51 and 52 of the tension plate are bowed away from the cutter 37. In assembly, the tension plate end 51 is secured to the comb 42 and housing 21 by means of screws 45. In order to prevent lubricant from escaping from the housing 21, a suitable grease seal 53 is positioned between the housing 21 and tension plate end 51. Tension plate end 52 is secured to comb 42 by means of a threaded stud 55 which is preferably welded to the comb. The stud 55 extends through an elongated slot 56 in cutter 37 and projects through opening 57 in tension plate end 52. An acorn nut 59 is in threaded engagement with stud 55 and is illustrated in FIG. 5 in the position where the nut is fully locked onto the stud. It should be understood that the acorn nut 51 is formed with a blind threaded bore whereby the stud 55 can be threadedly received therein for only a given distance before the two elements are locked together. Disposed between the nut 59 and tension plate end 52 is a spring washer 61 for ensuring that a proper force is maintained between the comb 42 and cutter 37 at the end thereof remote from the housing.

Since it is desirable for the comb 42 and cutter 37 to be flat after assembly, that is for the comb and cutter to be disposed in parallel juxtaposed planes, it is necessary that the comb 42 be slightly curved prior to assembly. Therefore, as can be seen in FIG. 3, the comb 42 is formed so that it bends downwardly away from the cutter 37. In general, the curve of comb 42 is such that it is tangent to the cutter 37 at a point adjacent to the housing 21. The amount of downward deflection of comb 42 at stud 55 is sufficient so that when the comb 42 is assembled to the cutter 37 and tension plate 50, the force necessary to move the comb 42 upwardly at stud 55 so that it comes in contact with cutter 37 is equal to the force necessary to draw the tension plate end 52 downwardly so that it also comes in contact with cutter 37. With this construction, the cutter 37 which is formed in a flat state has no pressure exerted upon it to bend it either upwardly or downwardly after assembly. The spring washer 61 is sufficiently strong to exert a biasing force greater than the force required to bring the plate 50 and comb stud 55 together.

To establish a good uniform shearing pressure between the cutter 37 and comb 42, the tension plate 50 is formed prior to assembly so that when its ends are secured to the comb, a uniform biasing force will be exerted downwardly on the cutter between the point where the cutter emerges from the housing 21 to threaded stud 55. That is to say, a constant force is exerted on and perpendicular to the cutter 37 biasing it towards the comb 42 per each unit of length between the points of attachment between the comb and tension plate 50 and, therefore, there is a uniform or constant normal force forcing the cutter and comb together at each point along the length thereof between the points of attachment. For accomplishing this, the tension plate 50 is formed to approximate the shape of a beam uniformly loaded and supported at its ends. Therefore, when the tension plate 50 is clamped in a flat position, such as when assembled to cutter 37 and comb 42, a uniform pressure is exerted by the tension plate 50 against the cutter 37 between the points of attachment at the housing 21 and the stud 55. Consequently, the configuration of the tension plate 50 prior to assembly, or as shown in FIG. 3, approximates a curve defined by the formula listed below:

$$\Delta = \frac{wx}{24EI}(l^3 - 2 \times 2l + x^3)$$

where $\Delta$ = deflection or vertical position of said plate
$w$ = a uniform load per unit of length
$x$ = horizontal distance inwardly from end attachment point
$l$ = length of said plate between attachment points
$E$ = modulus of elasticity of said plate
$I$ = moment of inertia of said plate section It has been determined that a curve very closely approximating the curve defined by the above formula can be fabricated for a pressure plate having a length of approximately 11¾″ by forming the center section of the plate on a 20″ radius for a horizontal distance of approximately 7″ with the end portions of the plate being straight and tangent the curved portion. The vertical distance between the center of the pressure plate and the ends is approximately ¾″, and when the plate is properly heat treated and fabricated from steelstock .062″ in thickness, a force of approximately 6.8 pounds is required at each attachment point which is approximately ¼″ from each end to bring the plate to a flat state. Using these dimensions, a load of approximately 1.2 pounds per inch will be exerted downwardly on the cutter between the points of attachment between the comb and plate.

When viewing the hedge trimmer as illustrated in FIG. 2, it can be appreciated that only a single fastener is required at a point spaced from the housing to maintain the proper tension between the comb 42 and cutter 37, and consequently, the single fastener does not significantly interfere with the movement or operation of the hedge trimmer. Moreover, since the comb, cutter and tension plate are rigidly held together only at the ends thereof, if an object should be jammed between the comb and cutter and the 1.2 pound per inch force between the comb and cutter is exceeded, the comb and cutter tend to separate permitting the cutter to continue to reciprocate. Therefore, when an object does become jammed between the comb and cutter, the cutter will be forced upwardly preventing a sudden impact to be imposed upon the mechanism located within the hedge trimmer housing 21 due to the sudden stopping of the cutter 37. Furthermore, since only one stud and nut are required to hold the comb and cutter together at a point spaced from the housing, this arrangement eliminates the cost of having a plurality of studs and nuts as commonly found in hedge trimmers.

While there has been illustrated and described a particular embodiment of the present invention, it will be understood that changes and modifications may occur to those skilled in the art and it is therefore contemplated by the appended claims to cover all such changes and modifications as fall within the true spirit and scope of the present invention.

What is claimed to be new and desired to be secured by Letters Patent of the United States is:

1. A hedge rimmer comprising a housing containing power means, an elongated stationary comb secured at one end to said housing and extending therefrom, an elongated flat cutter overlying said comb and in sliding relationship therewith, connecting means between said power means and said cutter for reciprocating said cutter in a lengthwise direction, a resilient elongated tension plate overlying said cutter and bowed before assembly to said comb so that its ends extend upwardly away from said cutter, said tension plate being secured only near each of its ends to said comb and said tension plate being sufficiently bowed before being secured to said comb whereby a substantially uniform shearing pressure is established between said comb and cutter between the points of attachment between said tension plate and comb.

2. The hedge trimmer of claim 1 wherein said comb is bowed slightly before assembly so that the end of said comb remote from said housing is bowed away from said cutter whereby after assembly said tension plate, cutter and comb are substantially flat.

3. The hedge trimmer of claim 1 wherein said tension plate at one end is secured to said comb by said housing and at the other end is secured to said comb by fastening means passing through said cutter.

4. The hedge trimmer of claim 1 wherein said tension plate is bowed before assembly so that it substantially conforms to a curve defined by the formula $$\Delta = \frac{wx}{24EI}(l^3 - 2x^2l + x^3)$$

where
$\Delta$ = vertical deflection
$w$ = uniform load per unit of length
$x$ = horizontal distance inwardly from end attachment point
$l$ = length of said tension plate between attachment points
$E$ = modulus of elasticity of said tension plate
$I$ = moment of inertia of said tension plate section 5. The hedge trimmer of claim 3 wherein fastening means including threaded element secured to said comb and projecting through an elongated slot in said cutter and through an opening in said tension plate, a member in threaded engagement with said element above said tension plate, means limiting the extent of engagement between said element and member, spring means between said member and tension plate exerting a biasing force greater than the resilient separating force between said tension plate and comb.

6. In a motor operated hedge trimmer comprising an elongated stationary comb having a row of teeth along at least one edge thereof, a substantially planar elongated cutter adapted for being reciprocated in a lengthwise direction by the hedge trimmer motor, said cutter having a row of teeth in sliding engagement with said comb row of teeth, an elongated tension plate secured only near each end thereof to said comb so that said cutter is sandwiched therebetween and is biased toward said comb, said tension plate bowed prior to assembly to said comb so that a substantially uniform force is exerted along the length of said planar cutter by said tension plate for establishing a uniform pressure between said cutter and comb teeth.

7. In the hedge trimmer of claim 6 wherein said comb is thicker and less resilient than said tension plate and said comb is bowed prior to assembly whereby said comb and cutter lie in parallel planes.

8. In the hedge trimmer of claim 6 wherein said tension plate is bowed and disposed with its center on said cutter and with its ends spaced away therefrom before securing said tension plate to said comb, first means securing said tension plate and comb together at one end and second means securing them together at the other end.

9. In the hedge trimmer of claim 8 wherein said first means comprising a hedge trimmer housing to which said tension plate and comb are attached, said second means comprising fastening means extending through said cutter.

10. In the hedge trimmer of claim 9 wherein prior to assembly said cutter is flat and said comb is curved slightly, when said first means secures said tension plate and comb to said housing and said second means is not attached, said comb is tangent to said cutter at said first means.

11. In the hedge trimmer of claim 6 wherein the pressure between said comb and cutter established due to the resiliency of and the degree to which said tension plate is bowed prior to assembly is sufficiently strong to accommodate normal shearing loads but sufficiently weak so that when a load which is injurious to the hedge trimmer is presented to said comb and cutter teeth said comb and cutter can separate for preventing damage to the hedge trimmer.

References Cited

UNITED STATES PATENTS

| | | | |
|---|---|---|---|
| 636,146 | 10/1899 | Hume | 30—221 X |
| 2,702,940 | 3/1955 | Dickerson | 30—210 X |
| 2,714,762 | 8/1955 | Green | 30—214 X |
| 2,717,443 | 9/1955 | Turbett | 30—210 |
| 3,193,925 | 7/1965 | Hawley | 30—210 |

LESTER M. SWINGLE, *Primary Examiner.*

J. C. PETERS, *Assistant Examiner.*

U.S. Cl. X.R.

30—221